(12) United States Patent
Ikeda

(10) Patent No.: US 6,282,329 B1
(45) Date of Patent: *Aug. 28, 2001

(54) PATTERN EDITING SYSTEM

(75) Inventor: Toshihiko Ikeda, Kounan (JP)

(73) Assignee: Brother Kogyo Kabushiki Kaisha, Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,209

(22) Filed: Feb. 10, 1998

(30) Foreign Application Priority Data

Feb. 13, 1997 (JP) .................................................. 9-028703

(51) Int. Cl.⁷ ...................................................... G06K 9/03
(52) U.S. Cl. ............................ 382/309; 382/111; 112/454
(58) Field of Search ..................................... 382/111, 190, 382/309; 345/420; 364/474.02; 112/454

(56) References Cited

U.S. PATENT DOCUMENTS 4,742,786 * 5/1988 Hashimoto et al. ............... 112/102.5
5,016,550 * 5/1991 Horie et al. ........................... 112/454
5,178,080 * 1/1993 Nomura et al. .................. 112/470.06
5,204,913 * 4/1993 Morooka .............................. 382/111
5,251,140 * 10/1993 Chung et al. .................... 364/474.02
5,313,902 * 5/1994 Shoji .................................... 112/454
5,325,474 * 6/1994 Kumazaki et al. ................... 345/433
5,459,586 * 10/1995 Nagasato et al. ..................... 358/450
5,559,709 * 9/1996 Ohno et al. ..................... 364/468.01
5,615,318 * 3/1997 Matsuura ............................. 345/420

FOREIGN PATENT DOCUMENTS 8272849   10/1996  (JP) .

* cited by examiner

Primary Examiner—Matthew C. Bella
Assistant Examiner—Gregory Desire
(74) Attorney, Agent, or Firm—Pitney, Hardin, Kipp & Szuch LLP

(57) ABSTRACT

Disclosed is a pattern editing system which extracts a unit pattern from repeatedly arranged patterns, arranges a plurality of unit patterns to form another repeated patterns consisting of only the unit pattern. Degree of matching of adjacent patterns are adjustable by correcting a distortion of the extracted unit pattern.

16 Claims, 7 Drawing Sheets

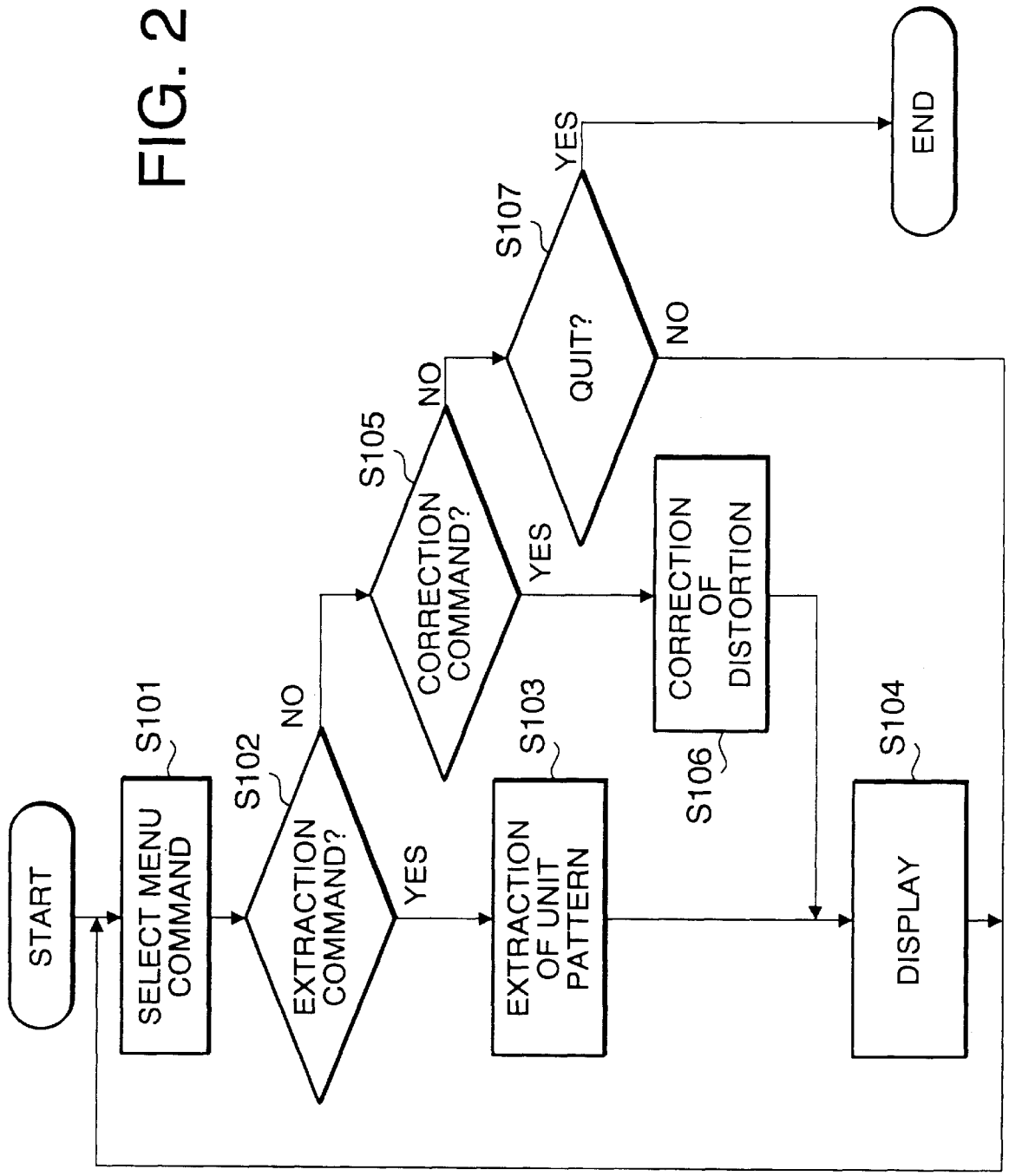

PATTERN EDITING SYSTEM

BACKGROUND OF THE INVENTION

The present invention relates to a pattern editing system for editing a pattern data using an image of repeated patterns.

Conventionally, attempts have been made to show a final form of clothes on a displaying device without actually making the clothes. An exemplary method for such attempts applied to a dress design displaying device is disclosed in Japanese Laid-Open Patent No. HEI 8-272849, teachings of which are incorporated herein by reference. In such a method, firstly, a piece of clothes is made using unfigured clothes material, then an image of the clothes is captured with a camera. An image of the unfigured clothes captured by the camera is then stored in a storage of a computer. Beside the image of the clothes, images of a plurality of figured materials are taken and also stored in the storage of the computer. Then, each of the image of the figured materials is composed with the image of the clothes and displayed to show the finished image (i.e., the final form) of the clothes.

In such a method, a problem arises in that when an image of the figured material is relatively small, the image of the pattern should be arranged to form repeated patterns to cover the clothes. However, at a border at which two images of the figured material are next to each other, the patterns may be shifted from each other (i.e., may not be continuously connected).

In particular, if the figured material includes repeated patterns, it is preferable that, by connecting one of the repeated patterns, the same repeated patterns are to be constituted. However, the captured image of the pattern may include a distortion, and it may be difficult to extract a rectangular image including a unit pattern. Even if a rectangular pattern is extracted, due to the distortion, the adjoining patterns may have offset.

To avoid such a problem, it has been necessary to create an image of a sufficiently large figured clothes material which may cover the image of the clothes. Such an image requires a large data storage area. Further, it is difficult to capture an image of such a large material.

SUMMARY OF THE INVENTION

It is therefore an object of the present invention to provide an improved pattern editing system which enables extraction of a unit pattern having no distortion from a clothes material having repeated patterns which may include distortion.

For the above object, according to the invention, there is provided a pattern editing system, comprising: an extracting device which extracts a unit pattern from a pattern image including repeatedly arranged patterns; a displaying device which displays the unit pattern extracted by the extracting device; and a correcting device which deforms the unit pattern as displayed to correct distortion of the unit pattern.

Since an accurate unit pattern distortion of which is cancelled is extracted, even if the repeated patterns are to cover a relatively large area, smoothly connected repeated patterns can be formed by arranging the unit pattern repeatedly.

Optionally, the pattern editing system may be provided with a data storing device which stores data of the unit pattern whose distortion has been corrected. Since the repeated patterns can be represented by the unit pattern, less data storage is required.

Further optionally, the displaying device is capable of arranging the corrected unit pattern repeatedly to display repeatedly arranged patterns.

Preferably, the pattern editing system may be provided with another data storing device which stores image data representing a shape of clothes; and an image composing device which generates a composite image by composing an image corresponding to the image data stored in the another data storing device and an image of the repeatedly arranged patterns, wherein the displaying device displays the composite image.

Thus, if the pattern editing system is applied to a dress design display device, the final form of the dress or clothes is displayed by composing the repeated patterns and the shape of the clothes.

Further optionally, the extracting device may include: a designation device which is manually operable to designate a quadrilateral area including the unit pattern to be extracted from the pattern image displayed on the displaying device; and a conversion device which converts the quadrilateral area designated by the designating device into a rectangle. In this case, the correcting device may include: a dividing device which divides the rectangle into a plurality of quadrilateral areas; and a deforming device which deforms an image included in each of the plurality of quadrilateral areas.

Optionally, the dividing device may be a mouse, and a point within the rectangle may be selectable and movable with use of the mouse. In this case, the image included in each of the plurality of quadrilateral areas may be deformed as the point within the rectangle is moved.

In this condition, the point is one of apices of the plurality of quadrilateral areas except apices of the rectangle.

Further optionally, the conversion device may convert the designated quadrilateral area into the rectangle by assigning image data of each point in the quadrilateral to a corresponding point in the rectangle in accordance with a predetermined algorithm.

Yet optionally, the deforming device may comprise: a transforming device which changes shapes of the plurality of quadrilateral areas; and an assigning device which assigns image data of each of the plurality of quadrilateral areas whose shapes have not yet been changed by the transforming device to corresponding one of the plurality of quadrilateral areas whose shapes have been changed by the transforming device.

Still optionally, the displaying device may arrange the unit pattern deformed by the correcting device repeatedly on a same plane to form repeated patterns.

Thus, when the deformation is not completely done, degree of distortion of the unit pattern can be recognized easily. If the distortion is corrected, the repeated patterns are connected smoothly.

Alternatively or optionally, the displaying device arranges the unit pattern extracted by the extracting device repeatedly on a same plane to form repeated patterns.

If the unit pattern has distortion, it can be recognized easily since the distortion causes offset between unit patterns arranged next to each other.

It is preferable that the deformation of the unit pattern made by the correcting device is reflected in the repeated patterns displayed on the displaying device. In such a case, a user can recognize the degree of distortion of the unit pattern based on the offset between the displayed patterns, and can correct the distortion of the unit pattern easily and accurately.

According to another aspect of the invention, there is provided a pattern editing system, comprising: means for extracting a unit pattern from a pattern image including repeatedly arranged patterns; means for displaying the unit pattern extracted by the extracting means; and means for deforming the unit pattern displayed by the displaying means.

Optionally, the extracting means may include: means for designating a quadrilateral area including the unit pattern to be extracted from the pattern image; and means for converting the quadrilateral area designated by the designating means into a rectangle, and in this case, the deforming means preferably includes: means for dividing the rectangle into a plurality of sub-areas; and means for transforming an image included in each of the sub-areas.

Further optionally, the transforming means may comprise: means for changing shapes of the plurality of sub-areas; and means for assigning image data of each of the plurality of sub-areas whose shapes have not yet been changed by the changing means to corresponding one of the plurality of sub-areas whose shapes have been changed by the changing means.

According to further aspect of the invention, there is provided a computer accessible memory storing a program representative of a pattern editing method for operating a pattern editing system, the method comprising the steps of: extracting a unit pattern from a pattern image including repeatedly arranged patterns; displaying the unit pattern extracted in the extracting step; and deforming the unit pattern displayed in the displaying step.

Thus, a computer is capable of executing the pattern editing operation by reading the program stored in the memory and executes the same.

Optionally, the extracting step may include the steps of: designating a quadrilateral area including the unit pattern to be extracted from the pattern image; and converting the quadrilateral area designated in the designating step into a rectangle, and the deforming step may include the steps of: dividing the rectangle into a plurality of sub-areas; and transforming an image included in each of the sub-areas.

Further optionally, the transforming step may comprise the steps of: changing shapes of the plurality of sub-areas; and assigning image data of each of the plurality of sub-areas whose shapes have not yet been changed in the changing step to corresponding one of the plurality of sub-areas whose shapes have been changed in the changing step.

Still optionally, the program may include the step of arranging the unit pattern deformed in the deforming step repeatedly on a same plane to form repeated patterns.

BRIEF DESCRIPTION OF THE DRAWINGS

FIG. 2 is a flowchart illustrating a pattern editing procedure;

DETAILED DESCRIPTION OF THE PREFERRED EMBODIMENTS

Hereinafter, the present invention will be described with reference to the accompanying drawings.

Figure 1A:
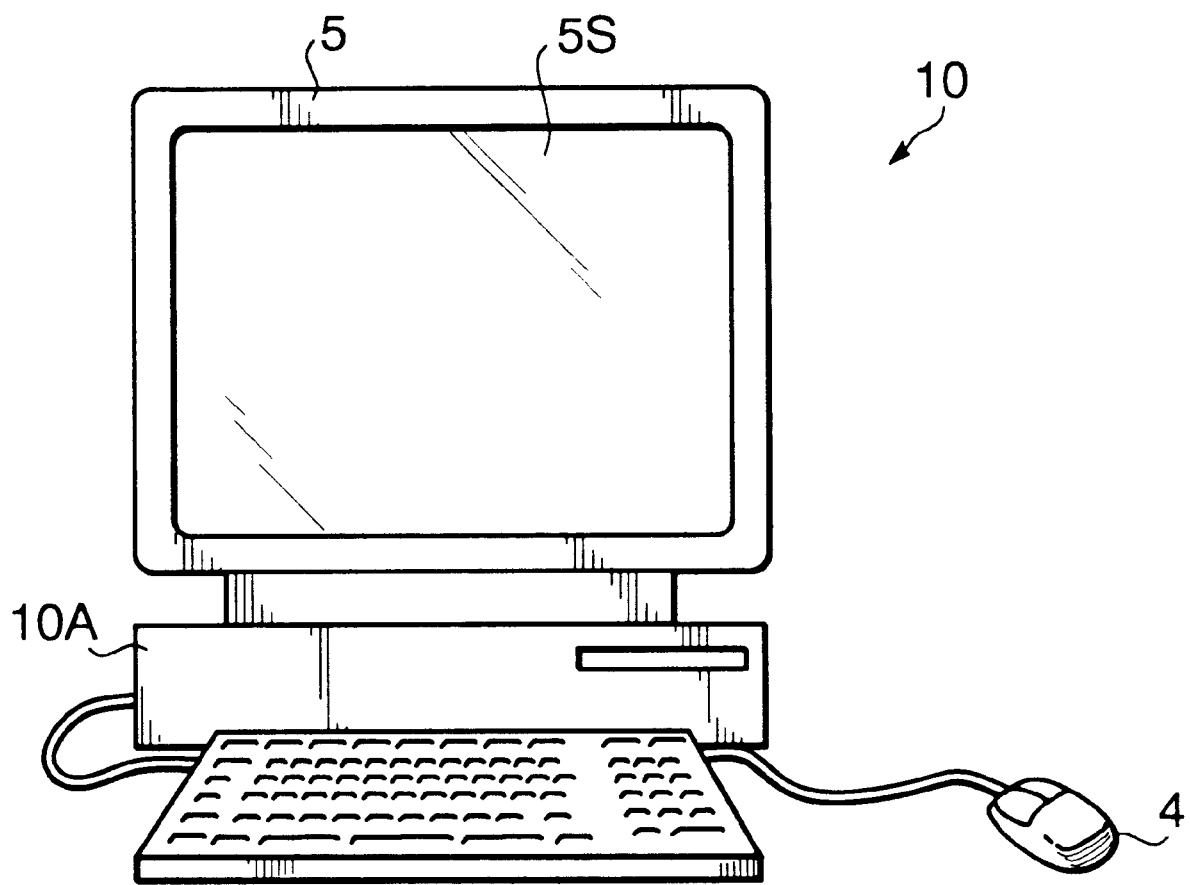
FIG. 1A shows a pattern editing system according to an embodiment of the invention.
Figure 1B:
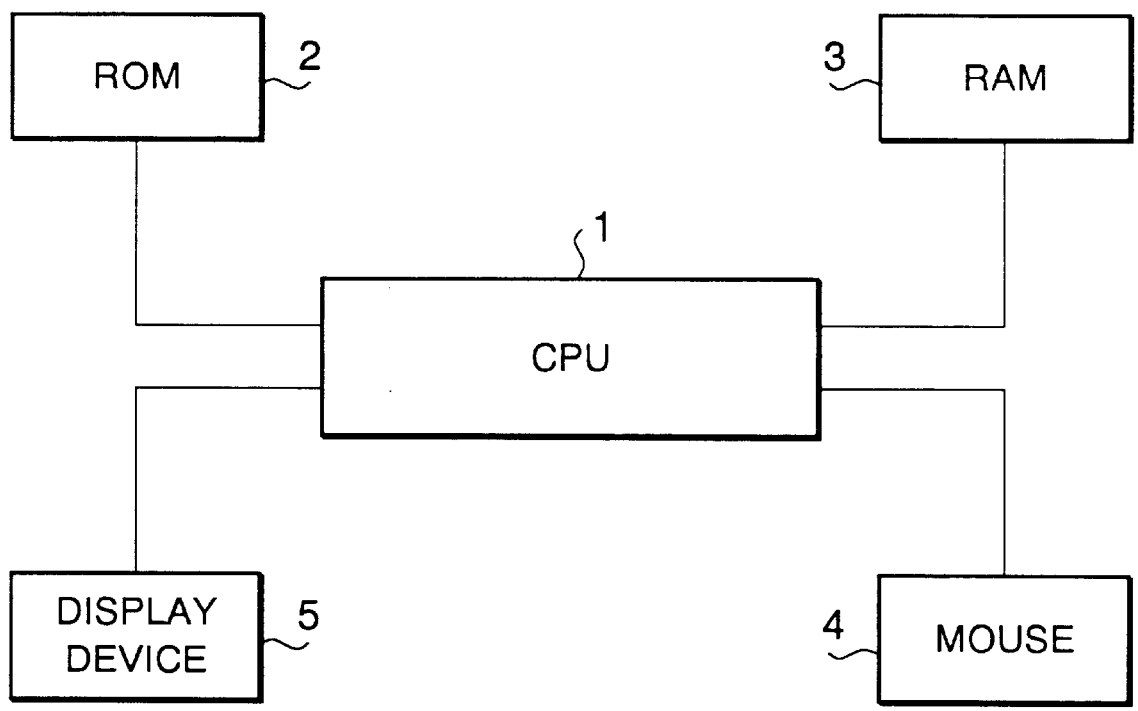
FIG. 1B is a schematic block diagram showing a control system of the pattern editing system.

FIG. 1A shows a pattern editing system 10 according to an embodiment of the present invention. The pattern editing system 10 has a main body 10A, a display device 5 having a display screen 5S, and a mouse 4. The main body 10A accommodates, as shown in FIG. 1B, a CPU (Central Processing Unit) 1, a ROM (Read Only Memory) 2, and a RAM (Random Access Memory) 3. The ROM 2, RAM3, the mouse 4, and the display device 5 are connected to the CPU 1.

The CPU 1 performs various operations by executing various programs stored in the ROM 2 for performing a pattern editing procedure which will be described hereinafter.

The RAM 3 is used for temporarily storing various types of data, and also used as a work area when the CPU 1 executes the programs.

The mouse 4 is used as a pointing device for designating various operations, e.g., selection of menus, to input the same to the CPU 1.

The display device 5 displays various menus on the screen 5S in accordance with processing executed by the CPU 1, and also displays images in accordance with the processed image data.

A user can select a command from among the various menu commands by locating a mouse pointer on a menu command displayed on the display screen 5S and click a mouse button. Hereinafter, the above operation is described such that a menu command is clicked or selected by the mouse 4.

FIG. 2 is a flowchart illustrating the pattern editing procedure executed by the CPU 1.

The pattern editing procedure is stored in the ROM 2 as a program or a plurality of program modules. In order to execute the pattern editing procedure, image data of a clothes material captured by a camera or the like and image data of a shape of the clothes are to be stored in the RAM 3 in advance. Further, prior to the pattern editing procedure, pattern image data representing repeatedly arranged similar patterns, one of which is to be extracted as a unit image, is read out of the RAM 3, and displayed on the screen 5S of the display device 5. At this stage, on the screen 5S, EDIT menu commands "EXTRACTION", "CORRECTION" and "QUIT" are also displayed to represent processes of "extraction of a unit image", "correction of distorted image data", and "quit of procedure", respectively.

Figure 4:
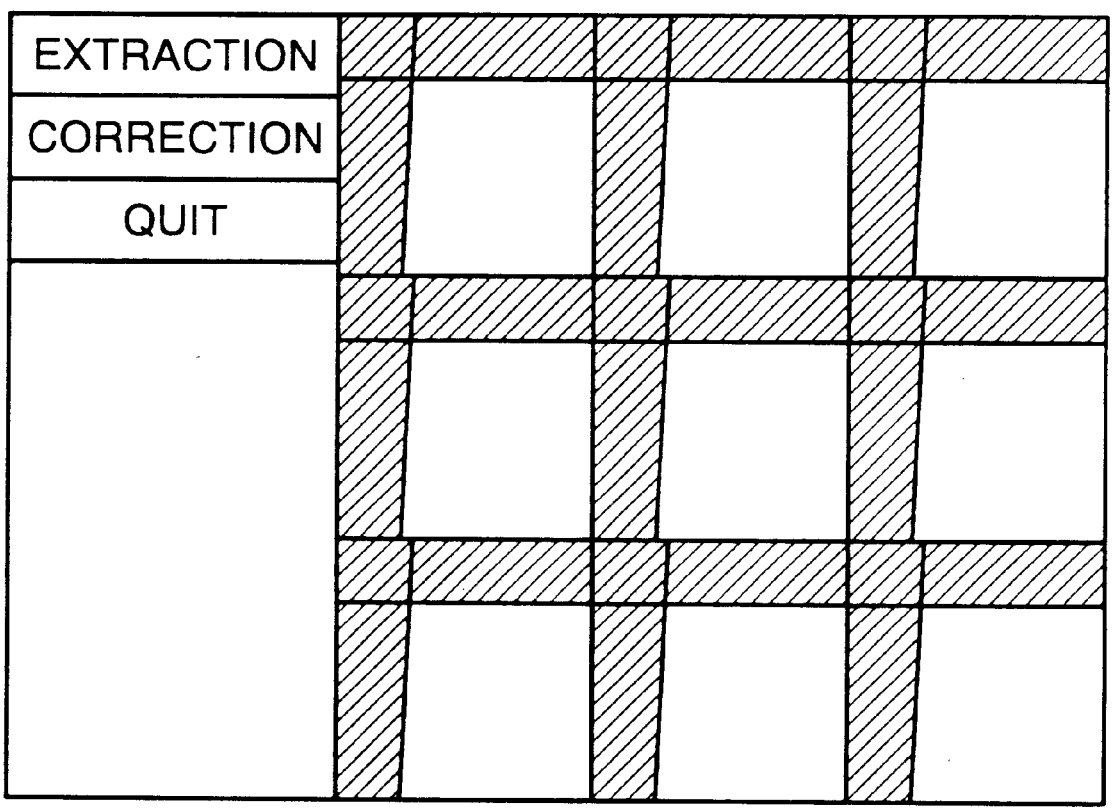
FIG. 4 shows a screen image of repeated patterns which are formed by repeatedly arranging the extracted unit pattern.

When the pattern editing procedure is executed, firstly, a user is required to select one of the EDIT menu commands (i.e., EXTRACTION, CORRECTION or QUIT) by clicking the mouse 4 (i.e. locating the mouse pointer at a menu command and clicking the mouse button) at S101. If the EXTRACTION is selected (S102: YES), a unit pattern extraction procedure is executed (S103). In this procedure, a part of the repeated patterns is extracted as a unit pattern, and the extracted unit pattern is repeatedly arranged to form repeated patterns which are displayed on the screen 5S, as shown in FIG. 4, in S104. Thereafter, control returns to the start of the pattern editing procedure shown in FIG. 2 and the EDIT menu commands are displayed on the screen 5S (see FIG. 4). As shown in FIG. 4, if the unit pattern has distortion, or needs deformation, the unit patterns are not connected smoothly. Therefore, the user can recognize the distortion of the unit pattern easily.

At this stage, if there is an offset between the unit patterns included in the adjacently arranged images at a border therebetween as shown in FIG. 4, the CORRECTION command (i.e., a distortion correction command) is selected among the EDIT menu commands (S102:NO; and S105:YES). Then, in S106, a distortion correction procedure is executed, and then a corrected pattern image is displayed on the screen 5S (S104), and control returns to S101 of the pattern editing procedure.

Figure 6:
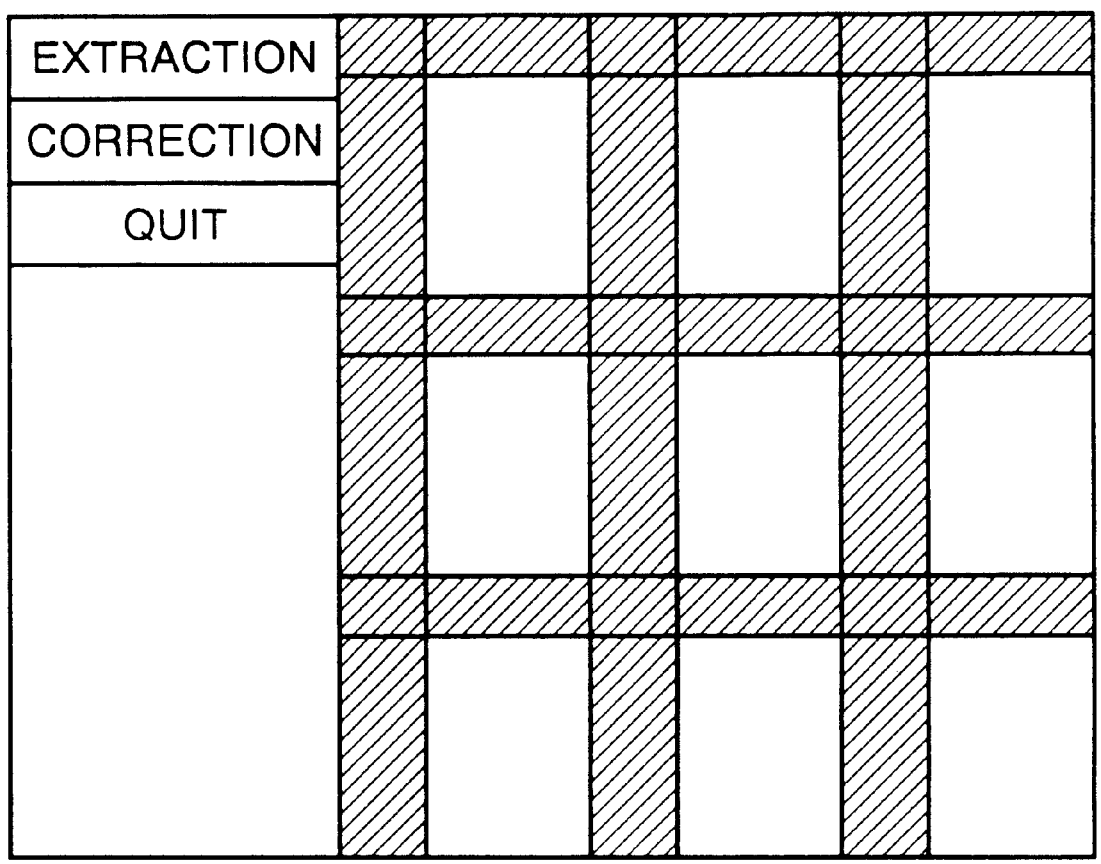
FIG. 6 shows an image of the repeated patterns composed of a plurality of unit patterns after the distortion is cancelled.

Until the offset is removed, the CORRECTION command is selected (S105:YES), and the distortion correction procedure is repeated (S106). When the offset is removed with the repeated execution of the distortion correction procedure, the QUIT command is selected (S107:YES), and the pattern editing procedure is finished. Image data of the unit pattern to which the pattern editing procedure has been applied (i.e., the distortion has been cancelled) is stored in the RAM 3. The repeatedly arranged unit patterns whose distortion has been cancelled are shown in FIG. 6. When the offset is removed, the unit patterns are connected smoothly as shown in FIG. 6, and therefore the user can correct the distortion accurately.

The unit pattern extracting procedure will be described with reference to FIGS. 3A–3E.

Figure 3A:
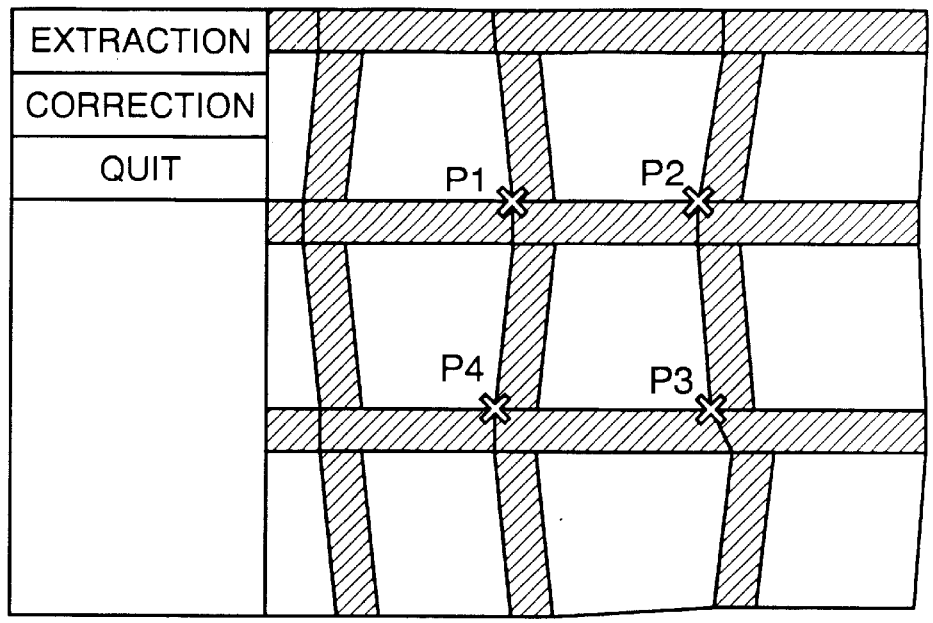
FIG. 3A shows a screen image of repeated patterns from which a unit pattern is extracted.
Figure 3B:
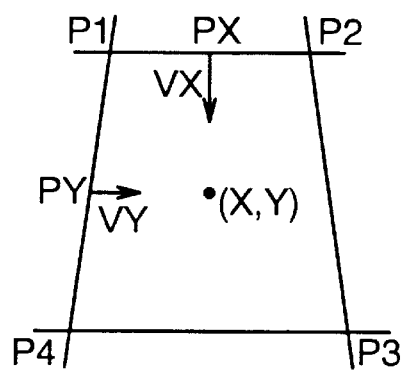
FIG. 3B is a quadrilateral area defined on the repeated patterns shown in FIG. 3A.
Figure 3C:
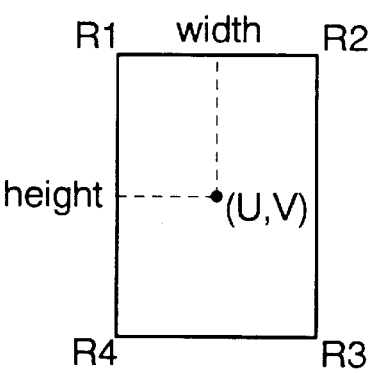
FIG. 3C is a rectangle, the quadrilateral shown in FIG. 3B being converted into the rectangle shown in FIG. 3C.

Firstly, the user is required to designate a quadrilateral area defined by points P1, P2, P3 and P4 on the screen 5S of the display device 5 as shown in FIG. 3A. Then, a rectangle is defined such that the width of the rectangle is equal to a length between the points P1 and P2 of the quadrilateral, and the height of the rectangle is equal to a length between the points P1 and P4 of the quadrilateral as shown in FIG. 3C. Accordingly, a length R1R4 equals a length P1P4, and a length R1R2 equals a length P1P2.

Next, correspondence between a point (U, V) in the rectangle R1R2R3R4 defined above and a point (X, Y) within the quadrilateral area P1P2P3P4 is defined as described below. As shown in FIG. 3B, a point dividing the line segment P1P2 into U:[width] is defined as point PX, and a point dividing the line segment P1P4 into V:[height] is defined as point PY, where [width] represents the length between the points P1 and P2, and [height] represents the length between the points P1 and P4.

In the quadrilateral P1P2P3P4, a crossing point of two opposing lines P1P4, P2P3 (i.e., lines obtained by extending the line segments P1P4 and P2P3) is to be obtained. If there is a crossing point of the lines P1P4 and P2P3, a vector extending from the crossing point to point PX is defined as vector VX. If there is not a crossing point, i.e., the lines P1P4 and P2P3 are parallel to each other, a vector extending from pint P1 to point P4 is defined as vector VX. Similarly, a crossing point of two opposing lines P1P2, P4P3 when they are extended is to be obtained. If there is a crossing point, a vector extending from the crossing point to the point PY is defined as a vector VY. If there is not a crossing point, i.e., the lines P1P2 and P4P3 are parallel to each other, a vector extending from pint P1 to point P2 is defined as vector VY. Then, X-Y coordinates of a crossing point (X, Y) of a line which passes point PX and parallel to vector VX, and a line which passes point PY and parallel to vector VY are obtained.

Figure 3D:
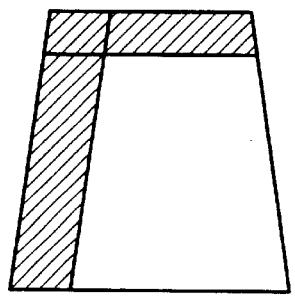
FIG. 3D is an image of a quadrilateral area defined on the repeated pattern shown in FIG. 3A.
Figure 3E:
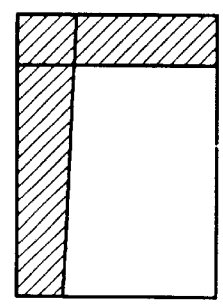
FIG. 3E is a rectangular area, the image of the quadrilateral shown in FIG. 3D being converted into the rectangular area shown in FIG. 3E.

Similar operation is applied to all the points within the rectangle R1R2R3R4 shown in FIG. 3C. That is, to all the points in the rectangle R1R2R3R4, corresponding points within the quadrilateral P1P2P3P4 are found. Then, to image data value for each point within the rectangle R1R2R3R4, image data of the corresponding point of the quadrilateral area P1P2P3P4, i.e., RGB (Red, Green, Blue components) data values are assigned. By converting the quadrilateral area P1P2P3P4 into the rectangular area R1R2R3R4, i.e., by assigning the data (i.e., the X-Y coordinates values) corresponding to the quadrilateral P1P2P3P4 shown in FIG. 3B to the rectangle R1R2R3R4 shown in FIG. 3C, a unit pattern, i.e., the rectangle R1R2R3R4 is extracted. By the above conversion, the image shown in FIG. 3D is converted into the image shown in FIG. 3E.

Figure 5A:
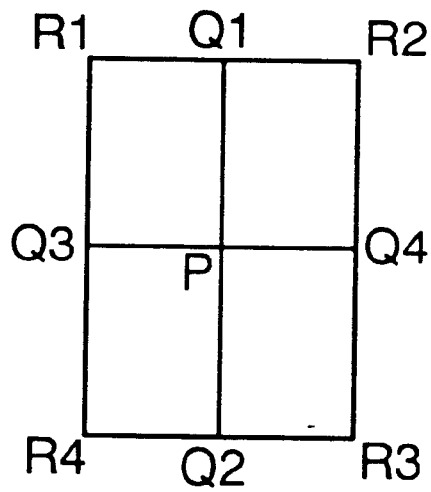
FIG. 5A is a rectangle defining the unit pattern and divided into a plurality of rectangular sub-areas.
Figure 5B:
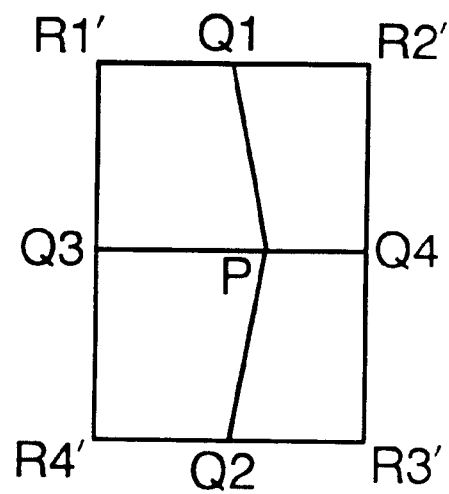
FIG. 5B shows a plurality of transformed quadrilateral sub-areas within the rectangle defining the unit pattern.

The distortion correction procedure will be described with reference to FIGS. 5A–5B. Firstly, the unit pattern R1R2R3R4 thus extracted is divided into a plurality of quadrilateral sub-areas. In the example shown in FIG. 5A, the sub-areas are rectangles. In order to define the sub-areas, lines are drawn on a unit pattern R1R2R3R4 displayed on the screen 5S by means of the mouse 4, and the rectangle R1R2R3R4 is divided into a plurality of rectangular (or quadrilateral) sub-areas. In the case of FIGS. 5A and 5B, with respect to the rectangle R1R4R3R4, a line segment Q1Q2, and a line segment Q3Q4 are drawn, thereby the rectangle R1R2R3R4 is divided into rectangles R1Q1PQ3, Q1R2Q4P, PQ4R3Q2 and Q3PQ2R4, where P is a crossing point where line segments Q1Q2 and Q3Q4 cross.

Figure 5C:
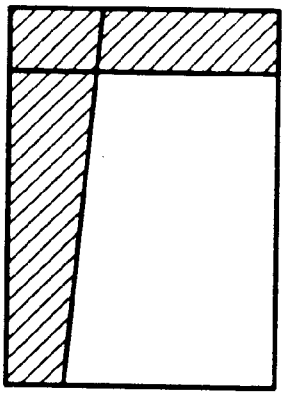
FIG. 5C is an image of the rectangular area corresponding to FIG. 5A.
Figure 5D:
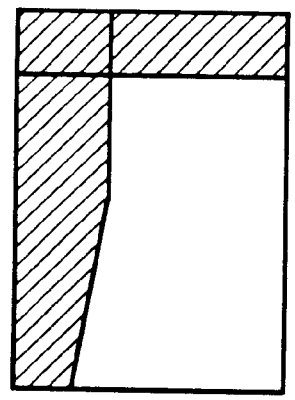
FIG. 5D is an image of a rectangular area when the quadrilateral sub-areas included therein have been transformed.

Then, deformation of the shape of the unit pattern is performed by selecting one of points which are apices of the rectangles (divided sub-areas) R1Q1PQ3, Q1R2Q4P, PQ4R3Q2 and Q3PQ2R4, and are not the apices R1, R2, R3 and R4 of the unit pattern with use of the mouse 4. In the example shown in FIG. 5A, if point P is selected, the selected point P can be moved in up-down direction and/or right-left direction on the screen 5S. If one of the points Q1–Q4 is selected, the selected point can be moved along the side on which the point is located. That is, if point Q1 is selected, point Q1 can be moved on the side between the apices R1 and R2. FIGS. 5A and 5B show a case where point P is moved. It should be noted that point P can be moved to any point within the rectangle R1R2R3R4. When the point P (or any other movable point) is moved, correspondence between the quadrilateral before deformed (R1R2R3R4), which is shown in FIG. 5A, and a deformed quadrilateral R1'R2'R3'R4', which is shown in FIG. 5B, is determined in accordance with the algorithm similar to that used for converting the quadrilateral P1P2P3P4 shown in FIG. 3B into the rectangle R1R2R3R4 shown in FIG. 3C. That is, quadrilaterals R1Q1PQ3, Q1R2Q4P, PQ4R3Q2 and Q3PQ2R4 are converted into rectangles R1'Q1PQ3, Q1R2'Q4P, PQ4R3'Q2 and Q3PQ2R4', respectively. With this conversion, the image of the extracted unit pattern as shown in FIG. 5C is converted to an image shown in FIG. 5D. By repeatedly executing the above-described transformation of quadrilateral sub-areas, the repeated patterns formed by repeatedly arranging the unit pattern are smoothly connected as shown in FIG. 6. Since the repeatedly arranged pattern shown in FIG. 6 can be formed from a single unit pattern, it is not necessary to store the entire image of the repeated pattern. Only by storing the unit pattern, the distortion of which has been corrected, the repeated patterns can be generated, and therefore only a small storage area is required.

Next, a composite image displaying procedure for composing the repeated patterns and unfigured clothes material is described. When the composite image displaying procedure is requested by the user by means of the keyboard 3, the repeated pattern, which are formed by arranging the unit pattern repeatedly, and the image data of the shape of the unfigured clothes are retrieved from the RAM 3 and composed, and the composite image representing the final form of the clothes is displayed on the screen 5S. An example of the composite image displaying procedure is disclosed in Japanese Laid-Open Patent HEI 8-272849, and description thereof will be omitted in this specification.

The invention may be embodied in other specific forms without departing from the spirit of essential characteristics thereof. The present embodiment is therefore to be considered in all respect as illustrative and not restrictive, the scope of the invention being indicated by the appended claims rather than by the foregoing description and all changes which come within the meaning and range of equivalency of the claims area therefore intended to be embraced therein.

The invention can be applied to various devices for displaying repeated patterns. For example, the present invention can be applied to a dress design display device which displays a composed image of the clothes formed with the repeated patterns. Since, according to the invention, based on a piece of image data representing a unit pattern, an image of distortion-free repeated patterns covering sufficiently large area can be formed, it becomes unnecessary to prepare an image of large figured clothes material, and accordingly, it is not necessary to use a memory for storing data representing such a large image. The present invention can also be applied to a displaying device which displays an image of a final form of a curtain or wallpaper having repeatedly arranged patterns.

The present disclosure relates to the subject matter contained in Japanese Patent Application No. HEI 09-28703, filed on Feb. 13, 1997, which is expressly incorporated herein by reference in its entirety.

What is claimed is:

1. A pattern editing system, comprising:
    an etracting device which erxtracts a single unit pattern from a pattern image including a plurality of repeatedly arranged patterns, each of said plurality of repeatedly arranged patterns being substantially identical to said single unit pattern;
    a displaying device which displays said unit pattern extracted by said extracting device; and
    a correcting device which deforms said unit pattern as displayed to correct distortion of said unit pattern,
    wherein said extracting device includes:
        a designation device which is manually operable to designate a quadrilateral area including said unit pattern to be extracted from said pattern image displayed on said displaying device; and
        a conversion device which converts said quadrilateral area designated by said designating device into a rectangle,
    wherein said correcting device includes:
        a dividing, device which divides said rectangle into a plurality of quadrilateral areas; and
        a deforming device which deforms an image included in each of said plurality of quadrilateral areas.

2. The pattern editing system according to claim 1, further comprising a data storing device which stores data of a corrected unit pattern, said corrected unit pattern being said unit pattern after said distortion has been corrected.

3. The pattern editing system according to claim 1, further comprising:
    another data storing device which stores image data representing a shape of clothes; and an image composing device which generates a composite image by composing an image corresponding to said image data stored in said another data storing device and an image of said repeatedly arranged patterns,
    wherein said displaying device displays said composite image.

4. The pattern editing system according to claim 1 wherein said dividing device comprises a mouse.

5. The pattern editing system according to claim 1, wherein said deforming device comprises a mouse, and wherein a point within said rectangle is selectable and movable with use of said mouse, and wherein said image included in each of said plurality of quadrilateral areas is deformed as said point within said rectangle is moved.

6. The pattern editing system according to claim 5, wherein said point is one of apices of said plurality of quadrilateral areas except apices of said rectangle.

7. The pattern editing system according to claim 1, wherein said conversion device converts said designated quadrilateral area into said rectangle by assigning image data of each point in said quadrilateral to a corresponding point in said rectangle in accordance with a predetermined algorithm.

8. The pattern editing system according to claim 1, wherein said deforming device comprises:
    a transforming device which changes shapes of said plurality of quadrilateral areas; and
    an assigning device which assigns image data of each of said plurality of quadrilateral areas whose shapes have not yet been changed by said transforming device to corresponding one of said plurality of quadrilateral areas whose shapes have been changed by said transforming device.

9. The pattern editing system according to claim 1, wherein said displaying device arranges said unit pattern deformed by said correcting device repeatedly on a same plane to form repeated patterns.

10. The pattern editing system according to claim 1, wherein said displaying device arranges said unit pattern extracted by said extracting device repeatedly on a same plane to form repeated patterns.

11. The pattern editing system according to claim 10, wherein deformation of said unit pattern made by said correcting device is reflected in said repeated patterns displayed on said displaying device.

12. A pattern editing system, comprising; means for extracting a single unit pattern from a pattern image including a plurality of repeatedly arranged patterns, each of said plurality of repeatedly arranged patterns being substantially identical to said single unit pattern;

means for displaying said unit pattern extracted by said extracting means; and means for deforming said unit unit displayed by said displaying means; wherein said extracting means includes:

means for designating a quadrilateral area including said unit pattern to be extracted from said pattern image; and means for converting said quadrilateral area designated by said designating means into a rectangle, wherein said deforming means includes:

means for dividing said rectangle into a plurality of sub-areas; and means for transforming an image included in each of said sub-areas.

13. The pattern editing system according to claim 12, wherein said transforming means comprises:

means for changing shapes of said plurality of subareas; and means for assigning image data of each of said plurality of sub-areas whose shapes have not yet been changed by said changing means to corresponding one of said plurality of sub-areas whose shapes have been changed by said changing means.

14. A computer accessible memory storing a program representative of a pattern editing method for operating a pattern editing system, said method comprising the steps of:

extracting a single unit pattern from a pattern image including a plurality of repeatedly arranged pattern, each of said plurality of repeatedly arranged patterns being substantially identical to said single unit pattern;

displaying said unit pattern extracted in said extracting step; and deforming said unit pattern displayed in said displaying step, wherein said extracting step includes the steps of:

designating a quadrilateral area including said unit pattern to be extracted from said pattern image; and converting said quadrilateral area designated in said designating step into a rectangle; and wherein said deforming step includes the steps of:

dividing said rectangle into a plurality of sub-areas; and transforming an image included in each of said sub-areas.

15. The computer accessible memory according to claim 14, wherein said transforming step comprises the steps of:

changing shapes of said plurality of sub-areas; and assigning image data of each of said plurality of sub-areas whose shapes have not yet been changed in said changing step to corresponding one of said plurality of sub-areas whose shapes have been changed in said changing step.

16. The computer accessible memory according to claim 14, further comprising the step of arranging said unit pattern deformed in said deforming step repeatedly on a same plane to form repeated patterns.

* * * * *